(12) United States Patent
Liu

(10) Patent No.: US 7,570,759 B2
(45) Date of Patent: Aug. 4, 2009

(54) SYSTEM AND METHOD FOR SECURE ENCRYPTION

(76) Inventor: Yen-Fu Liu, No. 15-2, Lane 125, Yuan-Hua Rd., Chungli City, Taoyuan Hsien (TW)

( * ) Notice: Subject to any disclaimer, the term of this patent is extended or adjusted under 35 U.S.C. 154(b) by 830 days.

(21) Appl. No.: 10/917,388

(22) Filed: Aug. 13, 2004

(65) Prior Publication Data

US 2006/0034453 A1    Feb. 16, 2006

(51) Int. Cl.
*H04K 1/00* (2006.01)
*H04L 29/06* (2006.01)
*H04L 9/32* (2006.01)
*H04L 9/08* (2006.01)
*G06F 13/00* (2006.01)

(52) U.S. Cl. ............. 380/28; 380/30; 713/156; 713/157; 713/160; 713/161; 713/168; 713/176; 713/177; 713/178; 713/180; 713/181

(58) Field of Classification Search ........... 380/28
See application file for complete search history.

(56) References Cited

U.S. PATENT DOCUMENTS 5,956,404 A * 9/1999 Schneier et al. ............ 713/180

2006/0036857 A1 * 2/2006 Hwang ....................... 713/168

FOREIGN PATENT DOCUMENTS

WO    WO 03096585 A1 * 11/2003

OTHER PUBLICATIONS

David Lie, Chandramohan A. Thekkath, Mark Horowitz, "Implementing an untrusted operating system on trusted hardware", Dec. 2003, SOSP '03: Proceedings of the nineteenth ACM symposium on Operating systems principles, Publisher: ACM, pp. 178-192.*

* cited by examiner

*Primary Examiner*—Matthew B Smithers
*Assistant Examiner*—Courtney D Fields
(74) *Attorney, Agent, or Firm*—Lowe Hauptman Ham & Berner, LLP

(57) ABSTRACT

A method for encrypting a message containing a plurality of message segments is described. First, a key is input into a SHA function to generate a first hash value. Then, a first message segment is encrypted into a first cipher segment by use of a part of the first hash value. Next, the first message segment and the first hash value are input into the SHA function to generate a second hash value. Following that, the second message segment is encrypted into a second cipher segment by use of a part of the second hash value. Subsequently, next message segment is repeatedly encrypted and input into the SHA function to generate a next cipher segment and a next hash value, respectively, until the last message segment is encrypted and the last hash value is generated.

33 Claims, 2 Drawing Sheets

SYSTEM AND METHOD FOR SECURE ENCRYPTION

BACKGROUND

1. Field of Invention

The present invention relates to an encryption/decryption method. More particularly, the present invention relates to an encryption/decryption method adopting a SHA function.

2. Description of Related Art

Encryption algorithms have been widely used in securing data and protecting privacy in communication. There are many proven asymmetric algorithms as well as symmetric algorithms that are secure and reliable. However, when implementing data encryption in a physical layer of a data transmission medium with an embedded cryptographic module, performance of the cryptographic module must not become the bottleneck of data transmission rate.

Most proven asymmetric algorithms have a high requirement for computation resources and time and are not suitable for encrypting high speed transmission data.

Symmetric algorithms are generally chosen for implementing high transmission speed cryptographic module hardware. Most symmetric algorithms use short fixed length keys and can only encrypt a small block of data at a time. AES (FIPS PUB 197), for example, encrypts a 128-bit data block at a time with a 128, 192, or 256-bit key. However, the security of AES is limited to the 256-bit maximum key length.

SUMMARY

There is a need for developing an encryption/decryption method that provides high security, reliable verification process, and low computation requirement.

It is therefore an objective of the present invention to provide an encryption/decryption method that can encrypt larger data blocks.

It is another objective of the present invention to provide an encryption/decryption method that produces a signature both in encryption and decryption process for verification.

It is still another objective of the present invention to provide an encryption/decryption method capable of taking a key of any length without changing any part of the algorithm.

It is still another objective of the present invention to provide an encryption/decryption method that has enough speed to match the performance of Giga Ethernet and encrypt/decrypt data at the rate of transmission.

In accordance with the foregoing and other objectives of the present invention, a method for encrypting a message containing a plurality of message segments is described. The method includes the following steps. First, a key is input into a SHA function to generate a first hash value. Then, a first message segment is encrypted into a first cipher segment by use of a part of the first hash value. Next, the first message segment and the first hash value are input into the SHA function to generate a second hash value.

Following that, a second message segment is encrypted into a second cipher segment by use of a part of the second hash value. Then, the second message segment and the second hash value are input into the SHA function to generate a third hash value. Subsequently, next message segment is repeatedly encrypted and input into the SHA function to generate a next cipher segment and a next hash value respectively until the last message segment is encrypted and the last hash value is generated.

If the cipher segments need to be decrypted, the key is used to decrypt the cipher segments to recover the message and the final hash value is used to verify the decrypted message. The message is kept secret during transmission. The SHA function can be SHA-1, SHA-256, SHA-384, or SHA-512.

In accordance with the foregoing and other objectives of the present invention, a method for decrypting a cipher containing a plurality of cipher segments is described. The method includes the following steps. First, a key is input into a SHA function to generate a first hash value. Then, a first cipher segment is decrypted into a first message segment by use of a part of the first hash value.

Next, the first message segment and the first hash value are input into the SHA function to generate a second hash value. Following that, a second cipher segment is decrypted into a second message segment by use of a part of the second hash value. Then, the second message segment and the second hash value are input into the SHA function to generate a third hash value.

Subsequently, the next cipher segment is repeatedly and sequentially decrypted and the corresponding message segment is repeatedly input into the SHA function to generate a next message segment and a next hash value respectively until the last cipher segment is decrypted and the last hash value is generated. The final hash value is used to verify the decrypted message. The message is kept in secret during transmission. The SHA function can be SHA-1, SHA-256, SHA-384, or SHA-512.

When the method is used in a communication system having a sender and a receiver, the method can further include the following steps. First, an identification number is sent from the sender to the receiver for identification of the sender. Then, the message is encrypted into cipher segments and generating a last hash value by the sender. Next, the cipher segments and the last hash value are sent to the receiver. Following that, the cipher segments are decrypted to recover the message and generates another last hash value. Then, the another last hash value is compared to the last hash value from the sender to determine whether the message is correctly decrypted.

The invention has at least the following advantages. The present invention provides an encryption/decryption method that can encrypt larger data blocks (160, 256, 384, or 512-bit) than AES (128-bit). The encryption/decryption method produces a signature (last hash value) both in encryption and decryption process for verification. The encryption/decryption method is capable of taking a key of any length without changing any part of the algorithm. The encryption/decryption method has enough speed to match the performance of Giga Ethernet and encrypt/decrypt data at the rate of transmission.

It is to be understood that both the foregoing general description and the following detailed description are examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
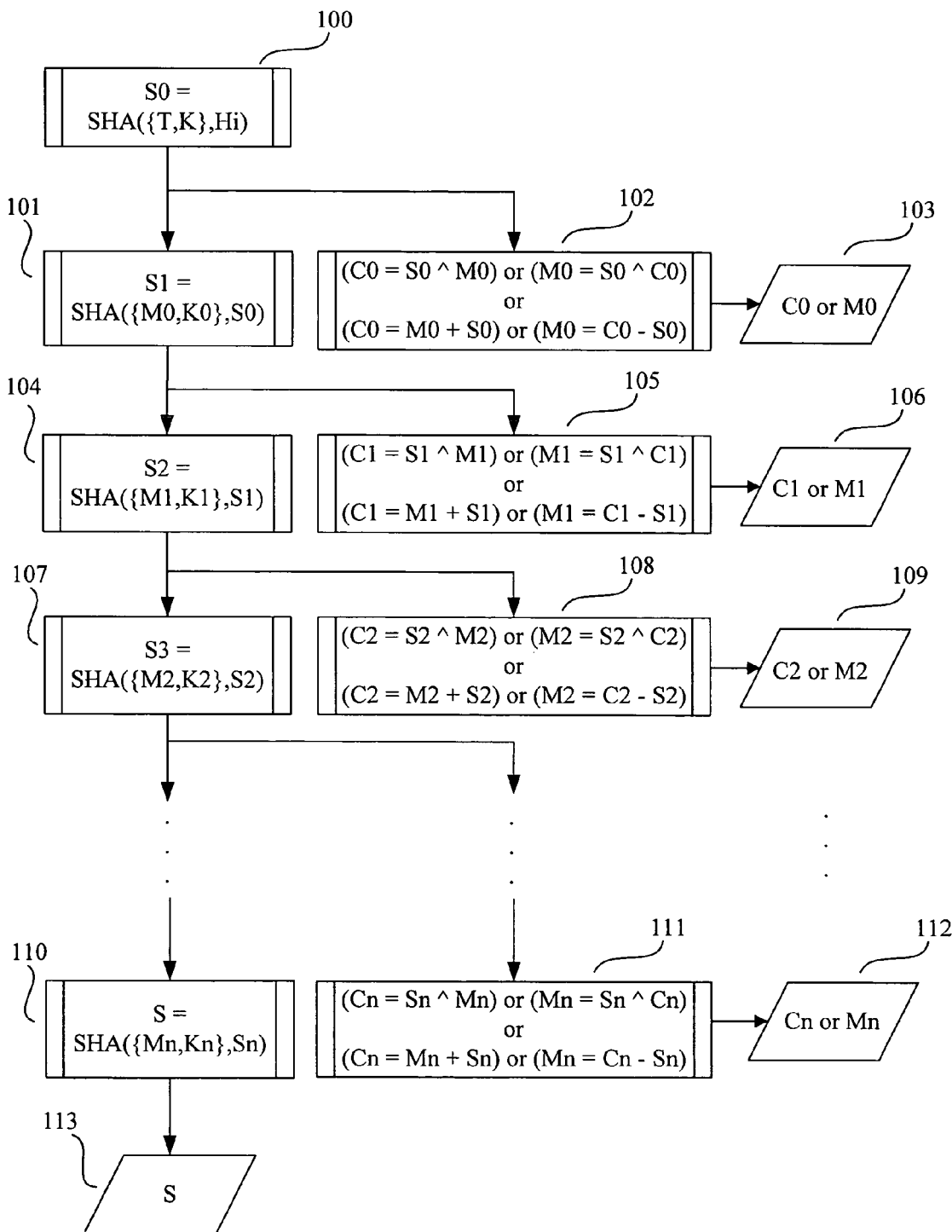
FIG. 1 is a flow chart illustrating an exemplary encryption/decryption method according to the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a flow chart illustrating an exemplary encryption/decryption method according to the invention. With reference to FIG. 1, a method for encrypting a message containing a plurality of message segments is described. The exemplary encryption method shown in FIG. 1 is referred to as SEA (secure encryption algorithm). SEA is a symmetric encryption algorithm based on Secure Hash Standard (FIPS PUB 180-2)—one-way-hash function based algorithms. SEA encrypts larger data blocks (160, 256, 384, or 512-bit) than AES (128-bit) and can take a key of any length without changing any part of the algorithm. In addition, SEA produces a signature of the message along with the cipher produced.

SEA processes data in unit called a segment. For encryption, a message is first divided into equal length message segments. For decryption, a cipher is divided into equal length cipher segments. In one embodiment, length of a message equals length of the cipher, and length of a message segment equals length of the cipher segment. The length of a message or a cipher is an integer multiple of a segment.

A segment can be any length not exceeding the length of the hash value generated by the SHA function. For example, the maximum length of a message segment for SEA is 160-bit if based on SHA-1, 256-bit if based on SHA-256, 384-bit if based on SHA-384, or 512-bit if based on SHA-512.

Let M represents a message and C represents a cipher. A message segment and a cipher segment are represented by $M_x$ and $C_x$, respectively, where 'x' is an integer representing the segment number. For example, $M_0$ represents first message segment and $M_1$ represents second message segment. Then, a message of n+1 segments can be represented by $M=\{M_n, \ldots, M_2, M_1, M_0\}$ where M is formed by concatenating $M_0$ to $M_n$. A cipher of the same message can be represented by $C=\{C_n, \ldots, C_2, C_1, C_0\}$.

SEA is a simple and straight forward algorithm, and just three functions are used throughout the algorithm.

1. $E(M_x, S_x)$: SEA encryption function with $M_x$ and $S_x$ as the two inputs. Output of this function is a cipher segment—i.e. $C_x=E(M_x, S_x)$.
   $M_x$: A message segment.
   $S_x$: A hash value (or a cipher seed) corresponding to a message segment.
2. $D(C_x, S_x)$: SEA decryption function with $C_x$ and $S_x$ as the two inputs. Output of this function is a message segment—i.e. $M_x=E(C_x, S_x)$.
   $C_x$: A cipher segment.
   $S_x$: A hash value (or a cipher seed) corresponding to a message segment, and applied to a cipher segment to decipher it.
3. $SHA(MB, H)$: A SHA function representing one of the SHS one-way-hash functions such as SHA-1, SHA-256, SHA-384, or SHA-512. Two inputs of the function are MB and H. Each hash value (SEA cipher seed) is produced with this function—i.e. $S_x=SHA(MB, H)$.
   MB: A message block of 512-bit long for SHA-1 and SHA-256 or 1024-bit long for SHA-384 and SHA-512.
   H: A starting hash value that is 160-bit long for SHA-1, 256-bit long for SHA-256, 384-bit long for SHA-384, or 512-bit long for SHA-512.

$E(M_x, S_x)$ and $D(C_x, S_x)$ functions can be implemented two ways. Both are valid SEA encryption and decryption operations as shown below (symbol ^ represents an XOR operation).

$$C_x=E(M_x,S_x)=M_x\hat{\ }S_x \quad M_x=D(C_x,S_x)=C_x\hat{\ }S_x \qquad 1.$$

$$C_x=E(M_x,S_x)=M_x+S_x \quad M_x=D(C_x,S_x)=C_x-S_x \qquad 2.$$

With reference to FIG. 1, in one embodiment, SEA starts by generating a first hash value (cipher seed) called S0 (step 100). $S0=SHA(\{T,K\}, Hi)$, where:

Hi is the initial hash value of SHA-1, SHA-256, SHA-384, or SHA-512 as specified in FIPS PUB 180-2; and {T,K} is a message block containing the values of T and K concatenated. The length of {T,K} should be no longer than 512-bit when using SHA-1 or SHA-256 and no longer than 1024-bit when using SHA-384 or SHA-512. Note that though empty space of a SHS message block can be padded with constant values before computation begins; however, in the interest of security, it is recommended the full length of a message block be utilized in SEA.

K is the primary key for both decryption and encryption operations.

T is a "time code", for example, a number representing the universal time at which the SEA is invoked. More explanation of T will be provided in later sections.

Next (step 102), the first hash value (cipher seed) S0 is used to encrypt a message segment with $E(M0,S0)$, producing C0 (step 103), or decrypt a cipher segment with $D(C0,S0)$, producing M0 (step 103). At the same time, the second hash value (the next cipher seed) S1 is also generated with $S1=SHA(\{M0,K0\}, S0)$ (step 101). The algorithm of encryption/decryption (step 102 and step 103) and generating next hash value (cipher seed) (step 101)—with $SHA(\{M_x,K_x\}, S_x)$—is repeated sequentially for all remaining message segments (steps 104-112). The last hash value (cipher seed) generated by the final message segment (step 110 and 113) is the signature (S) of a message.

In one embodiment, a new variable, padding variable, $K_x$ (K0, K1, K2, Kn shown in steps 101, 104, 107, 110, respectively) is introduced and will be explained in more detail. The basic purpose of $K_x$ is to fill the space of a SHS message block (MB). In $SHA(\{M_x,K_x\}, S_x)$, $\{M_x,K_x\}$ is a MB containing $M_x$ and $K_x$ concatenated. Length of a MB is either 512-bit (SHA-1 and SHA-256) or 1024-bit (SHA-512 and SHA-384), and the total length of $\{M_x,K_x\}$ must fill the MB in this embodiment. $K_x$ can be any constant value (e.g. a key) known to both the sender and the receiver of a message, a computed value generated by an algorithm known to both the sender and the receiver, or a combination of constant and computed values.

For example, $K_x$ can be a combination of a segment key, a constant value called, for example, $SK_x$, and a mathematical function of $S_x$ and K (the primary key), a function called, for example, $f(S_x,K)$. Then $K_x=\{SK_x, f(S_x,K)\}$ and $SHA(\{M_x, K_x\}, S_x)=SHA(\{M_x, \{SK_x, f(S_x,K)\}\}, S_x)$.

SEA allows length of the message segment to be shorter than the length of a hash value generated by a SHA function. Therefore, when $M_x$ and $C_x$ are shorter than $S_x$, $S_x$ cannot be used directly in $E(M_x,S_x)$ or $D(C_x,S_x)$. The solution is to use an $S_x'$ with the length of a segment instead of $S_x$, so $C_x=E(M_x,S_x')$ and $M_x=D(C_x,S_x')$.

In one embodiment, $S_x'$ can be a subset of bits chosen directly out of $S_x$ or a function of $S_x$—i.e. $S_x'=f(S_x)$. $S_x'$ is thus a part of the hash value $S_x$. For example, if a SEA implementation based on SHA-1 has 160-bit $S_x$ but the segment length is 128-bit, the Mx, Cx, and Sx' are all 128-bit long and Sx'=f(Sx). Simply, let f(Sx) be bits 1 to 128 of Sx, and the value of Sx' can be provided.

In one embodiment, the value of T is a time code. Though T can be any length as long as it is shorter than the length of a SHS message block, 128-bit is more than sufficient for representing a time code, and a 128-bit T is recommended for SEA. The remaining space in a SHS message block for the primary key K is 384-bit (for SHA-1 or SHA-256) or 896-bit (for SHA-384 or SHA-512), which is security enough against brute-force attacks.

However, an even longer K can be easily implemented with just a little modification to SEA. Suppose T is fixed at 128-bit and K is mega-bytes long; then {T,K} would be many SHS message blocks in length. Then S0 would simply be the message digest of the long {T,K} instead of the message digest of a single message block (100); the SHA(MB,H) function would have been called many times instead of just one time to finish computing S0. After obtaining S0 from the long {T,K}, SEA continues with encryption/decryption (step 101-113) as before.

The time code T enhances the security of SEA. Even when identical messages are transmitted at different times, SEA produces different ciphers for each of the transmission. Although T does not have to be a universal time, a universal time is perhaps the best choice for implementing T because time is continuous and the same value will not appear again once it has been used. In this embodiment, If two identical messages are encrypted with the same T, the ciphers will be identical as well.

In one embodiment, the value of T is provided by the receiver of a message and not generated by the sender of a message. Unlike K, which is a protected information only known by the sender and the receiver locally, T is openly transmitted. Another way to look at T is as a challenge code or a quiz from a receiver to a sender.

Figure 2:
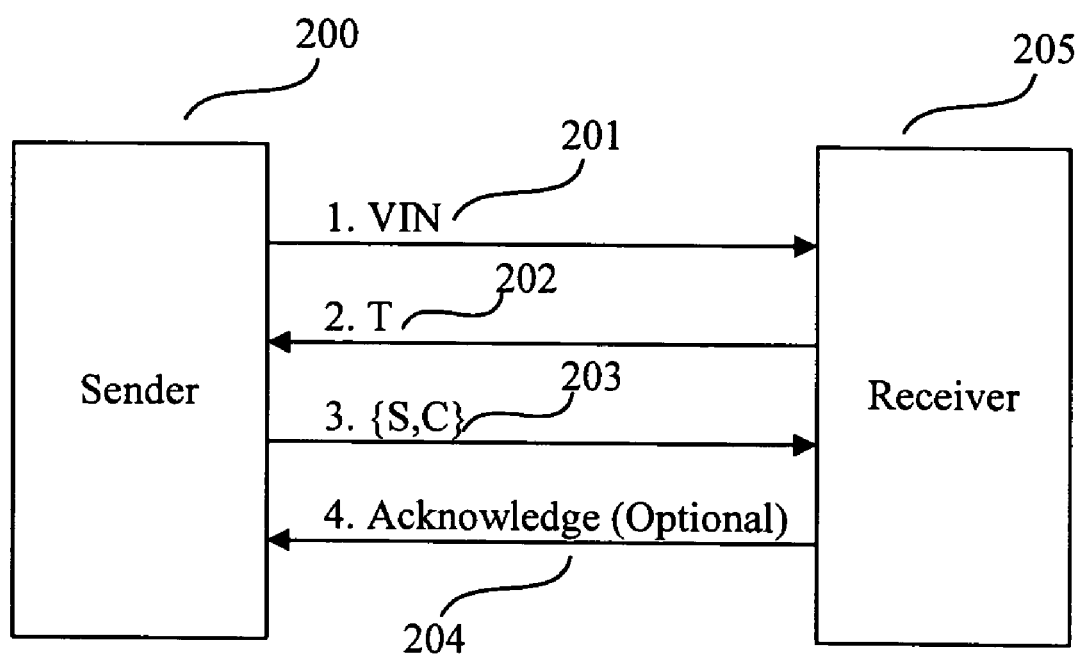
FIG. 2 is a diagram illustrating a communication system adopting the encryption/decryption method and a higher level communication protocol.

In another embodiment, to take full advantage of SEA, a higher level communication protocol needs to be defined. This protocol is shown in FIG. 2. FIG. 2 is a diagram illustrating a communication system adopting the encryption/decryption method and a higher level communication protocol. With reference to FIG. 2, first step, a sender 200 sends an identification number, such as a Vehicle Identification Number (VIN) 201, to a receiver 205. The VIN is used by the receiver 205 to identify the sender 200 and make necessary preparations for receiving a message from the sender 200. For example, the receiver 205 makes ready the primary key (K) matching the sender 200.

In step two, the receiver 205 sends a time code T 202 to the sender 200. The sender 200 uses the T 202 received from the receiver 205 to cipher a message and generate a signature (the last hash value) of the message with SEA. In step three, the sender 200 sends the cipher and the signature together {S,C} 203 to the receiver 205 (e.g. {S,C} is equivalent to {S,Cn, . . . C2,C1,C0} if the cipher has four segments or more).

The receiver 205 receives {S,C} and starts deciphering C, one segment at a time starting at C0, using the T value sent to the sender 200 previously and the primary key K. After all segments of the cipher C are sequentially decrypted and a message M is extracted, a signature (the last hash value) has also been generated with M by the receiver 205. The signature (the last hash value) generated by the receiver 205 in step 113 (shown in FIG. 1) is then compared to the signature (the last hash value) received from the sender 200 to validate the message deciphered. The message is valid if the two signatures are identical.

Then, in the optional final step, an acknowledge code 204 is sent by the receiver 205 to the sender 200 to let the sender 200 know if the message is accepted or rejected.

The SEA function can be implemented using, for example, a digital hardware referred to as Secure Encryption Accelerator (SEX). In one embodiment, to perform the SHA(MB,H) function in SEA, SEX can use either a SHA-256 Accelerator (SHAX-256) that can complete a SHA(MB,H) computation in 65 clock cycles, or a SHA-512 Accelerator (SHAX-512) that can complete a SHA(MB,H) computation in 81 clock cycles.

With reference to FIG. 1, length of the T (step 100) is 128-bit and length of the K (step 100) is 384-bit when implementing SHAX-256 and 896-bit when implementing SHAX-512. Hi (step 100) is 256-bit with SHAX-256 or 512-bit with SHAX-512. Length of a segment (Mx and Cx) is 256-bit with SHAX-256 or 512-bit with SHAX-512. Sx is also 256-bit with SHAX-256 or 512-bit with SHAX-512. The length of Mx is exactly half the size of the message block (512-bit for SHA-256 and 1024-bit for SHA-512); therefore, length of the Kx equals length of the Mx. Finally, SEX uses the value of Sx for Kx; therefore, SHA({Mx,Kx},Sx) (step 101, 104, 107, and 110) becomes SHA({Mx,Sx},Sx) in SEX. SEX coupled with SHAX to give a highly robust implementation of SEA.

In this embodiment, SEX can complete the computation of each Sx in either 65 clocks (with SHAX-256) or 81 clocks (with SHAX-512). The encryption/decryption procedure (step 102, 105, 108, and 111) is done asynchronously and is done in parallel with the hash value (the cipher seed generation procedure) (step 101, 104, 107, and 110). Therefore, it does not cost additional clock cycles.

Assuming there is an average of three clocks overhead for each hash value (cipher seed) generation procedure, then 68 clocks are required for computing Sx with SHAX-256 and 84 clocks required for SHAX-512.

In this embodiment, SEX implementation can easily achieve an average number of clocks per segment of 100 or less. In other words, for each 100 clocks, a SEX based on SHAX-512 can encrypt/decrypt a 512-bit segment of message and a SEX based on SHAX-256 can encrypt/decrypt a 256-bit segment of message.

If a 400 MHz clock is applied to SEX, the average amount of data that can be encrypted/decrypted per second is about 2 gigabits/second with SHAX-512 and about 1 gigabits/second with SHAX-256. This is enough speed to match the performance of Gigabit Ethernet and encrypt/decrypt data at the rate of transmission.

The invention has at least the following advantages. The present invention provides an encryption/decryption method that can encrypt larger data blocks (160, 256, 384, or 512-bit) compared to AES (128-bit). The encryption/decryption method produces a signature (last hash value) both in encryption and decryption process for verification. The encryption/decryption method is capable of taking a key of any length without changing any part of the algorithm. The encryption/decryption method has enough speed to match the performance of Giga Ethernet and encrypt/decrypt data at the rate of transmission.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An encryption and signature generation method executing on a device, the method includes encrypting a received message having at least one message segment, and comprises:
   a) receiving an initial hash value and a message block, the message block comprising a key;
   b) generating a current hash value based upon a hash function that receives as input the initial hash value and the message block;
   c) encrypting a received message segment into a cipher segment using at least a part of the current hash value;
   d) generating a next hash value using the current hash value and the received message segment as an input to the hash function;
   e) sequentially repeating steps c-d for a subsequently received message segment of the received message, wherein the next hash value becomes the current hash value to be used to encrypt the subsequently received message segment; and
   f) generating a message signature that includes the next hash value generated by step d using a finally received message segment of the received message.

2. The method of claim 1, wherein the length of a message segment does not exceed the length of the hash value generated by the hash function.

3. The method of claim 1, further comprising:
   for each received message segment, concatenating the received message segment and a padding variable to form a message block of a predetermined length; and
   inputting the message block and the current hash value into the hash function to generate the next hash value.

4. The method of claim 3, wherein the padding variable is a constant value.

5. The method of claim 3, wherein the padding variable is a computed value.

6. The method of claim 3, wherein the padding variable is a combination of a constant and a computed value.

7. The method of claim 1, further comprising:
   selecting a subset of the hash value generated by the hash function, wherein the subset of the hash value is equal in length to a received message segment; and
   encrypting a message segment into a cipher segment using the selected subset.

8. The method of claim 7, further comprising:
   performing an XOR operation on the received message segment and selected subset of the hash value.

9. The method of claim 7, further comprising:
   adding the selected subset of the hash value to the received message segment.

10. The method of claim 7, further comprising:
    subtracting the selected subset of the hash value to the received message segment.

11. The method of claim 1, further comprising:
    concatenating a time code and the received key to generate a message block of a predetermined length; and
    generating a first current hash value using as input to the hash function, the message block of a predetermined length and the initial hash value.

12. The method of claim 11, wherein the time code represents a universal time.

13. The method of claim 1, wherein the hash function is a secure hash algorithm (SHA) function.

14. The method of claim 13, wherein the SHA function is selected from the group consisting of SHA-1, SHA-256, SHA-384, and SHA-512.

15. The method of claim 1, wherein the method is performed by digital hardware and wherein for each message segment, a corresponding cipher segment and a corresponding next hash value are generated in parallel.

16. A method of decrypting an encrypted message received from a sender, the encrypted message comprising a plurality of cipher segments and generating a signature for authenticating a message decrypted from the encrypted message, the method comprising:
    a) inputting a key as at least a part of a message block, and an initial hash value as a starting hash value into a hash function to generate a current hash value;
    b) sequentially decrypting a current cipher segment of the encrypted message into a current message segment using at least a part of the current hash value;
    c) generating a next hash value using, as input to the hash function, the current hash value and a message block that includes at least the current message segment;
    d) repeating steps b and c for decrypting any subsequent cipher segment of the encrypted message, wherein the next hash value becomes the current hash value, and a subsequent cipher segment becomes the current cipher segment; and
    e) generating a authentication signature for the decrypted message using the next hash value, generated in step c when decrypting a final cipher segment.

17. The method of claim 16, wherein the length of a message segment does not exceed the length of the hash value generated by the hash function.

18. The method of claim 16, further comprising:
    for each message segment, concatenating the message segment and a padding variable into a message block of a predetermined length; and
    inputting the message block of a predetermined length and the current hash value into the hash function to generate the next hash value.

19. The method of claim 18, wherein the padding variable is a constant value.

20. The method of claim 18, wherein the padding variable is a computed value.

21. The method of claim 18, wherein the padding variable is a combination of constant and computed values.

22. The method of claim 16, further comprising:
    selecting a subset of the hash value for each hash value generated by the hash function, wherein the selected subset of the hash value is equal in length to a cipher segment; and
    decrypting a cipher segment into a message segment using the selected subset of the part of the hash value.

23. The method of claim 22, further comprising:
    performing an XOR operation on the cipher segment and the selected subset of the hash value.

24. The method of claim 22, further comprising:
    adding the selected subset of the hash value to the cipher segment.

25. The method of claim 22, further comprising:
    subtracting the selected subset of the hash value to the cipher segment.

26. The method of claim 16, further comprising:
    concatenating a time code and the key into a message block of a predetermined length; and
    inputting the message block and the initial hash value into the hash function to generate a first current hash value.

27. The method of claim 26, wherein the time code represents a universal time.

28. The method of claim 16, wherein the hash function is a secure hash algorithm (SHA) function.

29. The method of claim 28, wherein the SHA function is selected from the group consisting of SHA-1, SHA-256, SHA-384, and SHA-512.

30. The method of claim 16, wherein the method is performed by digital hardware and wherein for each cipher segment, a corresponding message segment and a corresponding next hash value are generated in parallel.

31. The encryption method of claim 1, further comprising:
sending an identification number to a decrypting device, the identification number configured to identify a sender of the encrypted message.

32. The encryption method of claim 16, wherein step e includes:

comparing the generated authentication signature with a signature, received from the sender, to determine authenticity of the received encrypted message.

33. The method of claim 26, the method further comprises:
receiving an identification number from the sender and identifying the sender;

sending the time code to the sender;

comparing the generated authentication signature with a signature, received from the sender, to determine authenticity of the received encrypted message.

* * * * *